Dec. 3, 1963  G. W. TRAVER  3,113,208
APPARATUS FOR AND METHOD OF CONDITIONING PLASTIC SURFACES
FOR THE ADHESION OF MATERIALS COATED THEREON
Original Filed March 27, 1953  2 Sheets-Sheet 1
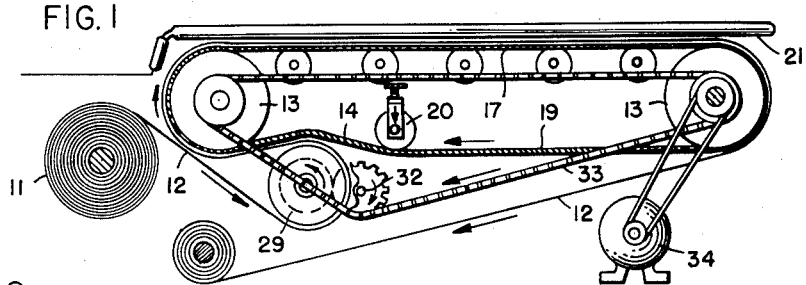
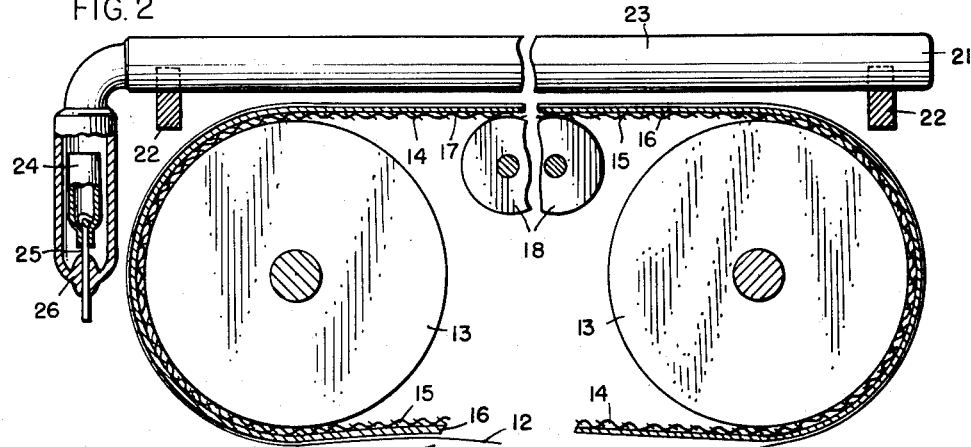
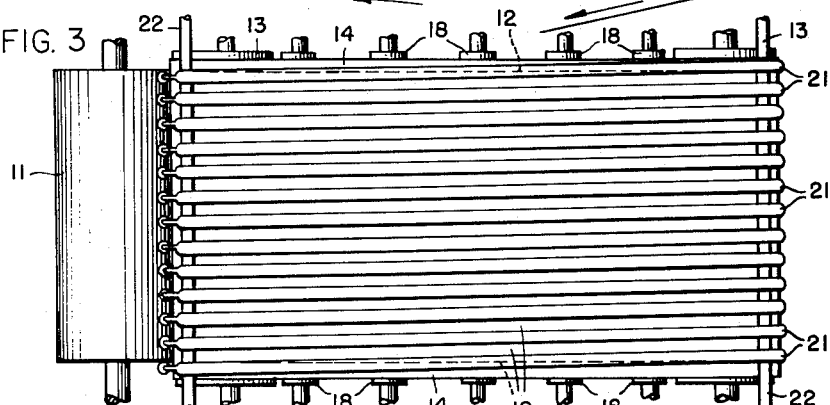
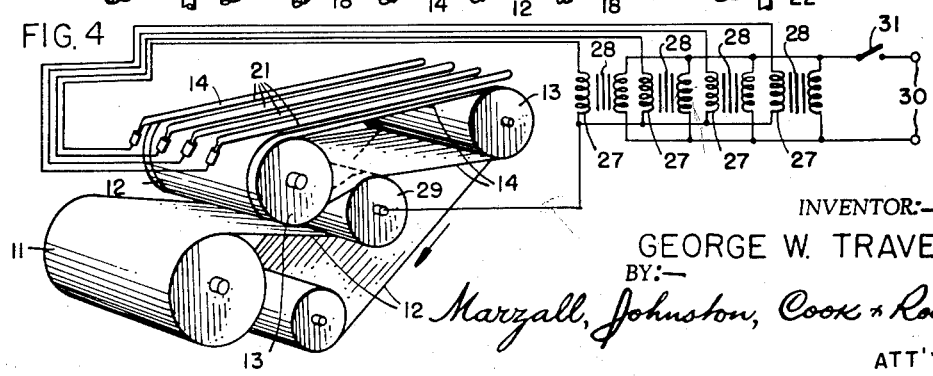
INVENTOR:—
GEORGE W. TRAVER
BY:—
Marzall, Johnston, Cook & Root
ATT'YS Dec. 3, 1963  G. W. TRAVER  3,113,208
APPARATUS FOR AND METHOD OF CONDITIONING PLASTIC SURFACES
FOR THE ADHESION OF MATERIALS COATED THEREON
Original Filed March 27, 1953  2 Sheets-Sheet 2
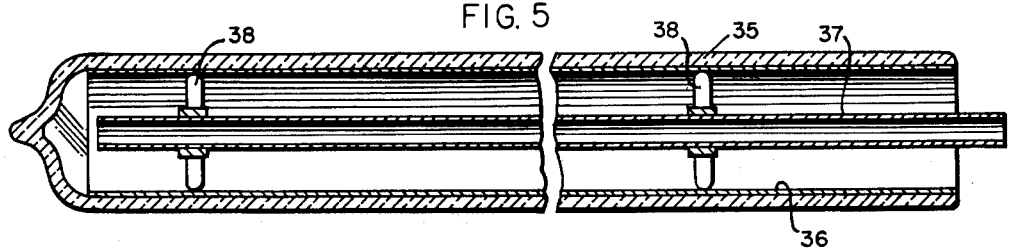
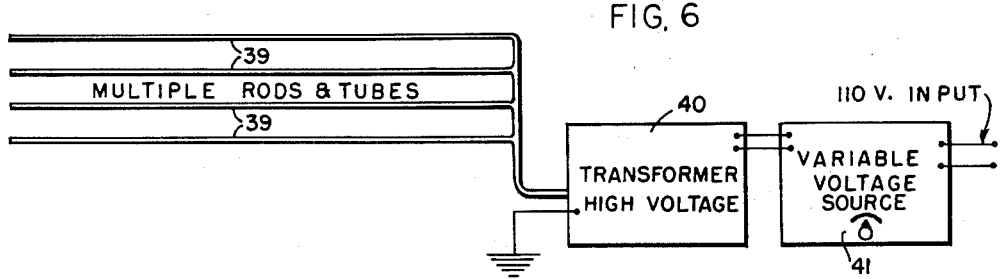
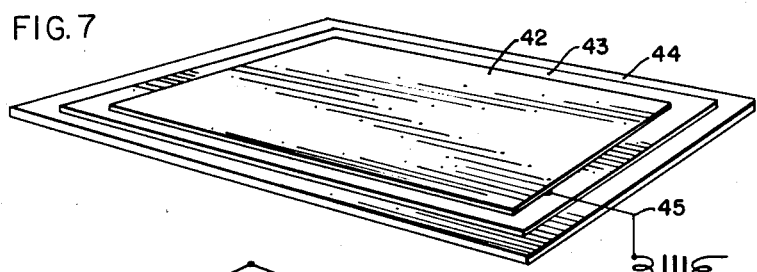
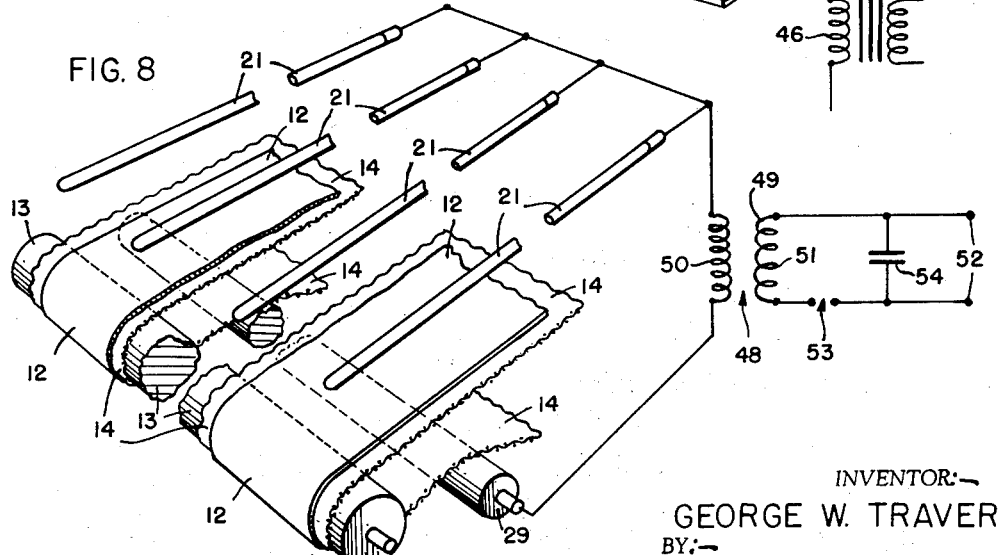
INVENTOR:
GEORGE W. TRAVER
BY: Marzall, Johnston, Cook & Root
ATT'YS

United States Patent Office 3,113,208
Patented Dec. 3, 1963

3,113,208
APPARATUS FOR AND METHOD OF CONDITIONING PLASTIC SURFACES FOR THE ADHESION OF MATERIALS COATED THEREON
George W. Traver, Chicago, Ill., assignor, by mesne assignments, to E. I. du Pont de Nemours and Company, Wilmington, Del., a corporation of Delaware
Original application Mar. 27, 1953, Ser. No. 345,015, now Patent No. 3,018,189, dated Jan. 23, 1962. Divided and this application Mar. 28, 1961, Ser. No. 98,901
12 Claims. (Cl. 250—49.5)

This invention relates to means for and method of treating the surfaces of bodies, comprising normally non-adherent material, to render the same capable of adhering strongly to subsequently applied materials, such as printing ink, paint, pigment, cement, adhesives, floc and other materials which it may be desired to coat, print or otherwise attach upon the treated surfaces, such subsequently applied materials, for convenience, being hereinafter called "coating materials."

The invention is particularly useful in treating the surfaces of plastic bodies, upon which coating materials do not readily adhere, in order to render such surfaces strongly adherent to such coating materials.

The present application is a division of my copending application, Serial No. 345,015, filed March 27, 1953, now Patent No. 3,018,189 which in turn is a continuation-in-part of my application Serial No. 277,320, filed March 18, 1952, and also of my application Serial No. 192,313, filed October 26, 1950, both now abandoned.

It is known that the surfaces of many types of materials or bodies are relatively non-adherent to inks, adhesives, paint, pigment, cement, decorative matter, and a large number of other coating materials, and that, after application to such non-adherent surfaces, the coating materials disintegrate and fall away or are readily rubbed off. For example, when inks or other coating materials are applied to the surface of a bottle or other object formed of polyethylene, or to the surface of a polyethylene film, it is found that the applied material fails to adhere to the surfaces and is easily removed.

In attempting to laminate various types of plastic materials, it is found that certain plastics are incapable of forming a satisfactory bond with the applied adhesive or other bonding material or cement; and that the adhesive separates readily from the non-adherent surface of the plastic.

Similarly, attempts at color coding polyethylene coated electrical wire or cable have been unsuccessful because of the non-adherent character of the plastic surface. Efforts to secure floc or other decorative material to plastic body surfaces have similarly been unsuccessful where such surfaces have the property of non-adherence to the coating material used as a binder.

Plastic material of the type now commonly employed in thin, relatively transparent sheets and in other forms for wrapping and packaging purposes, has presented especially difficult problems where coating materials will not adhere to any appreciable or satisfactory extent upon the plastic packaging material due to its extremely smooth and impervious character. For example, polyethylene film and similar films, which are non-adherent with respect to inks, pigments, adhesives and other coating materials, have been largely limited in usefulness because of the inability to print upon, decorate or laminate such film or films.

An important object of the present invention is to cause coating materials to adhere strongly upon normally non-adherent surfaces; a further object being to provide for treating the non-adherent surfaces of plastic material to cause the same to form a tight bond with applied coating materials.

Another important object is to condition the surface of plastic material for the strong adhesion of coating materials by exposing the surface to be treated to the action of electrical discharge, that is to say, to the impact of electrically charged particles forming the discharge, whereby, without apparently altering the surface texture or appearance of the material, to prepare the surface thereof for the firm adhesion of coating materials thereon.

Another important object is to condition the surface of plastic material for printing by bombarding the same with the electrically charged particles of an electrical discharge; a further object being to treat the surfaces of plastic material by exposing the same to electrostatic discharge, that is to say, the discharge of electrically charged particles that have been accumulated as a static charge of electricity on an electrode; a still further object being to treat plastic material by delivering it, preferably at a uniform rate of speed, progressively through an electrical discharge zone so that treatment may be accomplished at a relatively high and therefore economical rate of speed.

Another important object is to provide inexpensive means comprising spaced electrodes for applying an electrical discharge upon plastic material disposed therebetween for treatment; a further object being to produce the material treating discharge by applying pulsating electrical potential between spaced electrodes forming the opposite sides of a tretatment zone in which the plastic material to be treated may be exposed to the action of energy accumulated as an electrostatic charge on a said electrode and then discharged upon the material in the treatment zone; a still further object being to employ a gaseous conduction lamp as one of said electrodes and a plate or body of electrically conductive material, spaced from the lamp, as the other.

Another object of the invention is to condition the surface of difficultly printable plastic bodies by exposing the selected surface of the body to the action of electrostatic discharge, whereby, without perceptibly altering the appearance or texture of the material, the surface thereof is modified for the firm adhesion of inks, pigments or other coating materials. Yet another object is to expose the surface to be imprinted, decorated, laminated, or coated, to electrical discharge of intensity sufficient to effect a rapid modification of the surface being treated, thereby rendering it receptive and adherent to coating materials.

A still further object is to provide for moving the material to be treated continuously through a treatment field in which it is exposed to the action of electrical discharge. Yet another object of the invention is to provide novel apparatus that is highly effective in carrying out the desired treatment. Other specific objects and advantages will appear as the specification proceeds.

In accordance with the present invention, the treatment of plastic material may be accomplished by means of apparatus comprising a series of elongated tubular gaseous conduction lamps arranged in banks and in staggered or overlapping relation, the banks of tubes extending over each other and extending in different directions, or arranged in any desired way to form a continuous treatment field or zone. The lamps may be supported in spaced apart relationship with respect to a movable carrier member of electrical conducting material for supporting and transporting the material to be treated adjacent the lamps, thereby providing a treatment space or zone between each lamp and the carrier member. The material to be treated may pass successively through such zones for exposure to the electrical discharge produced therein by the operation of the lamps.

As one embodiment of the invention, I provide apparatus in which objects having surfaces to be treated are caused to traverse a treatment field or zone during an exposure interval of sufficient duration to accomplish the desired treatment. To this end, a plurality of elongated tubular gaseous conduction lamps may be disposed in parallel, side-by-side and adjacent relationship in combination with means for supporting the material to be treated closely adjacent the lamps while also providing means for relatively moving the material with respect to the lamps, so that the surfaces thereof to be treated may traverse the treatment field established by the operation of the lamps, preferably at a substantially uniform distance from the lamps. In such apparatus, I prefer to employ a movable body of electrical conducting material as a carrier for the material, which carrier forms, with each of the elongated tubular gaseous conduction lamps, an electrical condenser in which an electrical discharge field may be established about the material to be treated, in the spaces between the electrically conductive carrier and each of the lamps. While not necessary, I have found it desirable to arrange the lamps in a direction slightly skewed, or angularly displaced from the longitudinal direction of the sheet material, whereby each surface portion of the treated sheet may be exposed to the electrical discharge field of more than one of the lamps during the passage of the sheet through the field.

Further, in such apparatus, I prefer to provide support means for sheet material to be treated, comprising a sheet or plate of electrical conducting material spaced from the treatment lamps and upon which the sheet material to be treated may be supported in closely spaced relationship with respect to the lamps during the passage of the material through the treatment so established by operation of the lamps. My preferred support for such material is an endless belt of electrical conducting material mounted on and supported by suitable rollers, including means for tensioning the belt so that the sheet metal supporting length or stretch may be maintained in uniform spaced relation with respect to the treatment lamps throughout the treatment zone.

The invention is shown, in a specific illustrative embodiment, by the accompanying drawings, in which—

FIG. 1 is a side view in elevation of apparatus for treating non-adherent material in accordance with the present invention; FIG. 2, an enlarged broken sectional view of a portion of the apparatus shown in FIG. 1; FIG. 3, a top plan view; FIG. 4, a diagrammatic view of the apparatus and associated wiring layout; FIG. 5, a vertical sectional view of apparatus illustrating a modified form of the invention; FIG. 6, a schematic layout illustrating another modification of the invention; FIG. 7, a perspective view of a modified form of structure with which the invention may be employed; and FIG. 8, a diagrammatic showing of apparatus embodying a Tesla coil arrangement for accomplishing treatment at high frequency.

In the illustration given in FIGS. 1 to 4, inclusive, the material to be treated in the apparatus illustrated is in the form of a film of plastic, such as polyethylene. A roll 11 of the plastic material 12, in the form of a film or web, may be mounted in a suitable support frame and guided into and through a treatment zone. To this end, the support frame is shown provided with a pair of spaced guide rollers 13, carrying thereon an endless belt 14 of electrical conducting material. This belt may conveniently comprise a fabric base 15, which is desirable to give strength to the structure, and a surface coating 16 of electrical conducting material adhered upon the outer surface of the fabric base. The film of plastic material 12 may be drawn continuously from the roll 11 and guided around the rollers 13 and upon the conducting surface 16 of the belt 14, the web 12 being thus supported between the rollers 13 upon the upper stretch 17 of the belt 14, which may be, and preferably is, supported between the rollers 13 upon one or more stretch supporting rollers 18. The stretch supporting rollers 18 thus enable the web of plastic material 12 to be held in a substantially flat plane. The lower stretch 19 of the belt 14 may travel on a roller 20 which is adjustable in order to tension the belt on the rollers 18 and thus aid in maintaining the upper sheet supporting stretch 17 thereof in a flat plane.

Any suitable means for maintaining a treatment field may be employed. For example, the field may be produced readily and conveniently by the operation of tubular gaseous conduction lamps 21 in the vicinity of the path traversed by the web 12 between the rollers 13. To this end, the frame of the apparatus may be provided with mounting blocks 22, preferably of insulated material, forming seats for the reception of the tubular discharge lamps 21, said mounting blocks 22 being formed to support the lamps in closely adjacent but spaced apart and parallel relationship, the spacing of the lamps being preferably about one-eighth of an inch and the lamps being disposed in a common plane. The space between the lamps and the upper stretch 17 of the belt 14 may be of the order of about one-eighth of an inch, and up to more than one-quarter of an inch.

The lamps 21 shown in the drawing comprise a tubular glass envelope 23, hermetically sealed and charged with a gaseous conducting medium, such as argon. If desired, the glass envelope may be provided throughout its length with a ferrous compound or other electrical conductor of the type usually employed in tubes from which is discharge is made to a conductor therebelow. At one end, the tubular element 23 may be provided with an electrode 24 preferably comprising a hollow metal shell sealed within the tubular element and mounted upon a conducting stem 25 which projects outwardly of the element at its end, as through a glass-metal pinch seal 26, to allow for the electrical interconnection of the electrode in an external lamp energizing circuit. The electrode 24 of each of the lamps 21 may be electrically connected with one side of the secondary winding 27 of a corresponding transformer 28, a separate transformer being provided for energizing each of the lamps. The lamp remote ends of the secondary winding 27 of the several transformers may be interconnected in common and electrically connected with a roller 29 which, it will be noted, makes electrical contact with the conducting layer 16 of the belt 14.

As shown, the roller 29 may form a guide roller for guiding the film web 12 from the roll 11 onto the belt 14. Said belt is preferably somewhat wider than the web 12 so that the roller 29 may make electrical contact with the belt layer 16 outwardly of the side edges of the web 12. As a consequence, the conducting layer of the belt will constitute a plate extending on the side of the web 12 opposite from the lamps 23 to thereby aid in the establishment of an electron discharge field in the zone between the belt stretch 17 and the tubular lamps 21, when the lamps are in operation; and it will be seen that the web 12, in traveling between the rollers 13 upon the belt 14, will be caused to move progressively through such treatment zone. The primary windings of the transformers 28 may be interconnected in parallel relationship and energized from a suitable source of alternating electrical power 30 for the operation of the lamps each through its corresponding transformer. Suitable switch means 31 may, of course, be provided for controlling the operation of the lamps.

When the lamps are in operation, the gaseous medium, with which the same are charged, will become ionized to thereby provide each a glass enclosed column of a gaseous conducting medium in position extending parallel and closely spaced with respect to the electrically conducting belt layer 16, said spacement being of the order of one-quarter inch. Satisfactory treatment, however, is attainable within a spacement range from less than one-eighth of an inch to upwards of three-eighths of an inch. The gaseous conducting column of each lamp, in combination with the conducting layer 16 of the conveyor belt, constitutes a condenser in which electrons may be accumulated and discharged between the gaseous column of the lamp and the layer 16. These condensers, in conjunction with the glass lamp envelopes which enclose the gaseous columns, will discharge electrons between the lamp envelopes and the belt layer 16, at the frequency of the actuating energy supplied through the transformers 28; and the electrons thus discharged will be applied continuously to the film 12, as it passes between the lamps and the layer 16. As a consequence, the surfaces of the film 12 which face away from the layer 16 and toward the lamps 21 are rendered highly receptive and adhesive to common inks and pigments used in printing, as well as being adherent to adhesives, decorative material, and other coating materials.

Instead of employing tubular glass lamps of the character described, any other suitable means providing for the electrostatic accumulation and discharge of electrons may be used, the lamp structure which is shown being merely set out as illustrative of one form of means for producing a suitable treatment field. The lamps or other field forming means may be located directly above and parallel to the belt, or, if desired, the material to be treated may be carried on a carrier disposed at an angle away from the longitudinal axis of the tubes. The material may be passed under the lamps a single time to effect treatment thereof, or the treatment may be repeated one or more times, as desired. It is found that certain types of materials require longer exposure than others. It will be understood that the apparatus may be varied by increasing the length of the tubes or the number of longitudinally arranged tubes, whereby treatment may be effected in a single pass or by a series of exposures.

In the specific illustration shown in FIG. 3, the lamps are skewed or inclined with respect to the direction of movement of the web 12 in the treatment zone. In this connection, the angle or pitch, at which the lamps are mounted, is preferably such that the opposite ends of each lamp are relatively displaced, in a direction transversely of the direction of movement of the web, a distance equal to, or a whole number multiple of, the spacement between the central axes of the lamps. Accordingly, each portion of the web throughout its entire width will be exposed to substantially the same quanta of treatment as is applied to every other web portion as the same is drawn at a uniform rate of speed through the treatment zone.

If relatively high voltage, in excess of, say, five thousand volts, is employed, it is found that the effective treating area below the lamps is greater and the lamps need not be so closely associated in order to give an unbroken area treatment of the polyethylene film or structure therebelow. However, if the applied voltage is relatively low, I prefer to have the tubes closely associated so that there will be no spaced areas of treated material, unless, of course, such spaced area treatment is desired. For a thorough and complete treating of the surface therebelow, while using relatively low voltage, I prefer to employ tubes arranged in staggered relation or banks of tubes running in different directions so as to form an electrical field which completely covers the area of polyethylene which is to be treated.

Any suitable or preferred means may be employed to drive the belt 14, and to deliver the web 12 of plastic material thereon. To this end, as shown in the drawings, the roller 29 may be driven by gear means on a counter shaft 32. The counter shaft may in turn be driven by an endless chain 33 carried on gears or sprockets on the shaft 32 and on the shafts of the rollers 13; and a preferably electric motor 34 may be employed to drive the shaft of one of the rollers 13 and hence, through the chain 33, to drive the other roller 13 and the guide roller 29.

As a specific example of the process, the following may be set out: A sheet of polyethylene film is carried by the carrier belt 14 below tubes 21 of approximately 40 inches in length and having approximately 37 inches of effective length over the film. The carrier belt is operated at a speed of 100 feet a minute, and the voltage employed in connection with the tubes is approximately 10,000 volts. After treatment, the surface of the film was found to be strongly adherent to coating materials, including printing ink, pigments, decorative material, floc, and adhesives. The coating material may be applied at any time after the treatment described. For example, the film was found to be highly receptive to such materials and adherent thereto even after storage for months following treatment.

Similarly, a bottle formed of polyethylene, after exposure to the tubes, was found to be changed in character with respect to receptiveness of inks, pigments, and decorative material, the exposed surface of the bottle being strongly adherent to adhesives and to ordinary inks, coloring pigments and other coating materials. Similar plastic bodies having surfaces which were ordinarily non-adherent to such coating materials, were found to become adherent to the materials as to those surfaces exposed within the treatment field.

In addition to rendering plastic surfaces adherent to decorative material, inks, and other coating materials, I have found that treated film may now be readily laminated and united not only with film of like character, but with different types of film. For example, polyethylene film may be readily secured to itself and other plastics. To render the plastic film or laminae receptive to the adhesive, the film is first exposed to the treatment described, and then the second layer of film is treated in the same way. Adhesive is then applied to one or both of the treated surfaces to be joined. The two films or laminae are then brought into contact with each other, with the adhesive or treated sides together. Maximum surface contact may be obtained by rolling the layers between rollers. The adhesive may be of a polymerizing type with high cohesive strength, but satisfactory binding can be had with a variety of types of adhesive and, in some instances, it is found that ordinary printing inks of a highly polymerizing type may be successfully used to laminate and simultaneously to color the transparent films. Where the film is of a type which can be successfully laminated without treatment, it is not necessary to treat such a film and a good lamination is achieved by treating only the surface of the difficultly adherent material.

The process is also effective in enabling color coding of polyethylene coated electrical wire or cable. After exposure of the polyethylene or other plastic coating, the color application is made and is found to be highly adherent to the plastic surface.

Similarly, a plastic surface to which floc or other decorative material can not be successfully secured has been effectively covered with floc and other decorative material by first exposing the surface to the action of electrical discharge, in the manner heretofore described, and then applying adhesive to the treated surface, floc being blown then upon the adhesive surface or deposited thereon by other well known means.

I am unable to explain why the surfaces of such bodies having the property of non-adherence to such added materials are changed by exposure to the treatment field so that they then become adherent. The appearance of the exposed surface to the naked eye is unchanged, but, whereas the surface was formerly nonreceptive to coating materials, it has become, after the treatment, highly receptive and forms a strong union with adhesives, bonding material, pigments, inks, floc, and other forms of decorative matter.

Certain tests made with a Beckman Recording Infrared Spectrophotometer indicate that the herein described treatment brings about a great increase of unsaturation of the surface polyethylene molecules or an increase in the amount of $R_2C=CH_2$ groups. These groups are produced by the degradation of the long chains, probably at points along the chain where the side branches are attached. The very substantial unsaturation produced by the treatment can also be ascertained quantitatively by measuring the weight of bromine vapor absorbed by the film in the dark. The tests gave no evidence of oxidation. Oxidation produces carbonyl groups, ketones and aldehydes, but no carboxyl groups. The carbonyl group has a strong absorption at 5.9, but none could be detected in the samples treated. Oxygen in any form also absorbs strongly between 8 and 10, but no indication of this existed. From the tests, it appears that the electrical discharge treatment greatly increased the number of unsaturated linkages in the polyethylene surface molecules and that this treatment caused the surface now to become adherent to the decorative matter.

Polyethylene which has been thermally treated to render a surface thereof adherent to decorative matter, as by the application of a flame thereto, is found to have not only an increase in the unsaturated linkages or double bonds, but also there is evidence of oxidation. In contrast, the electrical treatment described herein, while giving the unsaturated linkages, yields no evidence of oxidation.

The present process, in which an electrical discharge field is brought to bear upon a polyethylene film, is found to be particularly useful and valuable in that the field can be applied to selected areas. Thus, if it is desired to leave a portion of the film or body untreated in order that it may be more effectively heat sealed, the electrical discharge field is applied only to the selected areas, the remainder of the film being unmodified. Since the treatment reduces the heat sealing quality of the film, certain bands of the film may be left untreated where heat sealing is to be employed.

The time of exposure and the intensity of the electrical discharge may vary considerably, depending upon the type of polyethylene body, its configuration, or the type of plastic, other than polyethylene, being treated. In the treatment of polyethylene, I bring to bear upon the selected surface an electrical discharge of sufficient intensity to bring about an unsaturation of polyethylene molecules on the surface of the body being treated. The unsaturation of the polyethylene molecules which occurs as the result of such electrical discharge, causes the character of the entire surface to be modified so that it becomes adherent to applied decorative matter or other coating materials.

In the modification shown in FIG. 5, I provide a single glass tube 35 having its interior lined with an electrical conducting material 36, such as a ferrous compound or other metallic compound ordinarily employed in such a discharge tube. The outer end of the tube is closed, while the inner end which receives the electric conductor 37 is open. If desired, insulating spacer supports 38 may be used, or, instead thereof, the rigid conductor 37 may be supported upon a means outside of the glass tube. The conductor 37 may be a copper tube to which current is supplied. If desired, the inner coating 36 may be omitted. The open end of the tube should be at a substantial distance from the belt conductor so that no direct discharge will take place from that portion of the copper tube 37 extending outside of the glass tube 35.

The method of treating polyethylene for better ink adherence includes a variety of means for producing the electrical discharge field. The field may be formed by high voltage tubes, rods, screens, wires, or a variety of electrical conducting elements energized by means of high voltage transformers, generators, rectifiers, or similar sources. In my former tests, each conductor was supplied with its own individual source of voltage. I have now found that the same treatment can be effected by using a single high voltage source for multiple tubes, rods, screens, and the like, controlled by suitable voltage varying means.

In the structure shown in FIG. 6, a plurality of elements 39, which may be rods, tubes, screens, or other electrical conductors, are supplied with current from a high voltage transformer 40 connected, through a voltage varying device or regulator 41, to a power input indicated in the drawing as a 110 volt input.

Instead of employing tubes, rods or screens as conductors, I may also employ a single metallic plate as a conductor. I prefer to employ with such a plate a glass shield, and, if desired, a conductive coating on the glass. In the illustration given in FIG. 7, I provide a metal foil, such as aluminum foil 42, lying on a conductive coating 43, and beyond the coating 43 a glass plate 44. A lead 45 connects a transformer 46 with the foil 42. This plate structure may be substituted for the lamps 21 in the arrangement illustrated in FIGS. 1–4.

In the operation of the structure shown in FIG. 7, the structure is placed above a plate of electrical conducting material or a belt, as shown in FIGS. 1–4. The voltage across the transformer secondary is then applied between the two conducting plates to form an electrical discharge field. The polyethylene to be treated is placed between the lower conducting plate or conveyor and the upper glass plate 44. By feeding the output of the voltage regulator (employed with the transformer) across the primary of the transformer, it is possible to vary the output of the transformer, and thus the voltage between the plates. Although the area of the plate 44 was increased in tests carried on from 5 square inches to 150 square inches, all other factors remaining constant, there was no change in the treatment effected. The treatment was obtained regardless of the spacing between the glass plate 44 and the conductive plate spaced therebelow, so long as the spacing was not too great to prevent corona discharge between plates, nor so small that there was no air gap between the top surface of the polyethylene and the bottom side of the glass plate 44. Even treatment was obtained between the plate 44 and the conductive plate therebelow although the plates were approximately ¼ inch out of parallel. In general, the longer the time of exposure between the plates, the more effective the treatment.

The conductive coating 43, as well as the conductive coating 36, or any conductive coating employed with the main conductor, is utilized to extend or widen the treatment field or electrical discharge source, and any material suitable for this purpose may be used. For example, the coating may consist of silicone, magnesium, barium, and zinc. Copper and lead with traces of magnesium and iron, may be also added in the coating. Since such conductive coatings for tubes and other apparatus are well known, a detailed description is believed unnecessary.

Various explanations have been suggested as to why the above described process and apparatus is effective in changing the character of the polyethylene surface being treated to render it adherent to coating materials. The operation of the apparatus is believed to bring about the electron bombardment of the polyethylene surface. It is thought that such bombardment increases the number of unsaturated linkages in the polyethylene surface molecules. The corona observed during the operation is visible evidence of the flow of electrons.

I have found that the greater the voltage between the upper field forming device and the lower conductor on which the polyethylene may rest, the more effective the treatment. For example, by the use of a Tesla coil, as shown in FIG. 8, voltages have been raised from a very low voltage up to 100,000 volts and above. At extremely high voltages, the lower conductor or ground was dispensed with and effective results were obtained. Tests were carried on which showed that when input voltage was increased from 80 volts up to 12,000 volts, the treatment improved with the increase in voltage. At 15,000 volts and above, unusually effective treatment was obtained. I prefer to use a voltage in excess of 10,000 or 12,000 volts. Another advantage of employing relatively high voltage resides in the circumstance that the treated area becomes wider or broader with increase in applied voltage. When tubes are used in parallel arrangement, the broadening of the area of treatment caused by increase in voltage produces even treatment upon the polyethylene body, without requiring the tubes to be brought closely together or to be arranged in overlapping relation. When gaseous discharge tubes are used with low voltage and widely spaced apart, it is sometimes found that "banding," that is to say, the production of untreated gaps on the film parallel with the tubes, occurs. However, as the input voltage to the tubes is increased, the untreated bands disappear.

As shown in FIG. 8, the electrodes 21 and the belt carrying roller 29 are electrically connected with a conventional Tesla coil system embodying a high ratio air core transformer 49 having a secondary winding 50 comprising a large number of turns connected between the belt carrying roller 29 and the electrodes 21 which may, of course, be gaseous conduction tubes of the sort shown in FIGS. 1–4, or metal rods as shown in FIG. 6, or other suitable or preferred type of electrode. The air core transformer also comprises a primary winding 51, having relatively few turns as compared with its secondary winding, said primary winding being connected in series with a spark gap 53 across an alternating current electrical power source 52 of voltage sufficiently high to energize the winding 51 through the spark gap 53. A condenser 54 is connected across the power source and is alternately charged by the source 52 to a potential sufficiently high to break down the air gap 53 and then discharged through the gap and the primary winding of the air core transformer. The condenser is thus charged and discharged many times per second to thereby produce radio frequency oscillations in the resonant circuit formed by the electrodes and the secondary winding 50 of the transformer, thereby producing a film treating electrical discharge at high frequency and high voltage across the gap between the electrodes 21 and the belt 14.

As above indicated, it is believed that electron bombardment of the polyethylene surface, at sufficient intensity to detach hydrogen atoms from the polyethylene surface molecules, removes hydrogen atoms in sufficient numbers to creat a reasonably uniform unsaturated surface. In this operation the voltage should be sufficiently high, relative to the dielectric value of the polyethylene and the air gap, to bring about effective bombardment, and a voltage of from 2,000 volts upwards is desired. In addition, the frequency should be regulated to vary the speed of treatment. While very low frequencies, such, for example, as 24 cycles per second, are apparently adequate to secure treatment, I prefer to employ applied energy at frequencies of at least 60 cycles per second for attaining treatment at commercial rates of speed. Substantially higher and very high frequencies at a given voltage give improved treatment results. Specific examples may be set out as follows:

(1) A Tesla coil with 20,000 volts secondary output was operated at frequencies of from 10 per second to 60 per second, giving treatment varying from adequate to heavy as the frequency was increased, for a given time exposure of 5 seconds, the discharge being from the ball on the secondary coil.

(2) A transformer with 10,000 volt output was operated at 60 cycles per second for treating film at a rate of 100 linear feet per minute, the discharge being through tubes, as illustrated in the drawings of the present application, adequate treatment being obtained.

(3) An operation was carried on as described in Example 2 except that the frequency was held at 3.8 megacycles, by means of an electronic hookup to a 10,000 volt primary, using the secondary of the above transformer as the primary of the electronic system, the discharge being through tubes as in Example 2. Highly effective treatment was obtained almost instantaneously.

(4) In apparatus similar to that shown in the drawings and employing a voltage of 15,000 volts at a frequency of 180 cycles per second, treatment was effected at approximately 175 linear feet per minute. The frequency was obtained by driving a 120 volt generator with three times the number of commutator points as is required for a 60 cycle output and then stepping up the voltage through the use of the transformer.

While, in the foregoing specification, I have set forth specific structures and steps in considerable detail for the purpose of illustrating embodiments of the invention, it will be understood that such details of structure and method may be varied widely by those skilled in the art without departing from the spirit of my invention.

The invention is hereby claimed as follows:

1. Apparatus for treating a surface of a body that is relatively non-adherent to subsequently applied coating material to render such surface adherent to such material, comprising a support for said body, a conductor disposed above said body at a spaced distance therefrom, and radio frequency generating means for supplying current to said conductor at such voltage and frequency as to produce electronic bombardment of said surface.

2. Apparatus as set forth in claim 1, wherein a layer of insulating material is employed with the conductor to distribute the discharge of electrons over the surface of the body being treated.

3. Apparatus for treating the surface of a plastic body to render the same adherent to subsequently applied coating material, comprising a pair of spaced apart electrodes, means for supporting a body to be treated between said electrodes, and means for applying electrical energy upon said electrodes to produce a pulsating radio frequency electrical discharge therebetween in position to expose the body to the impact of electrically charged particles comprising said discharge.

4. Apparatus as set forth in claim 3, wherein one of said electrodes forms a carrier for supporting the body to be treated, while the other electrode, in combination with the carrier, serves to establish the pulsating discharge.

5. Apparatus as set forth in claim 3, wherein one of said electrodes forms a carrier for supporting the body to be treated, while the other electrode comprises a gaseous conduction lamp embodying a column of gas enclosed within a glass envelope, said lamp, in combination with the carrier, serving to establish an electrical discharge field of pulsating character between the lamp and the carrier for application upon the body to be treated.

6. Apparatus for treating a non-conductive plastic body to improve the receptivity of a surface thereof to adhesives, comprising a pair of spaced apart electrode means providing an ionizing air gap therebetween, high voltage radio frequency generating means connected across said electrode means for producing sufficiently high electric intensity in said gap to break down the air in said gap, and means for moving said plastic body through said gap between said electrode means.

7. Apparatus for treating non-conductive plastic film to improve the receptivity thereof to adhesives such as printing inks, comprising a pair of metallic electrode means disposed in spaced relationship to provide an air gap therebetween, means to move a non-conductive plastic film through said gap, and radio frequency generating means having the output thereof impressed across said electrode means for producing a field of electric force in said gap having a potential gradient greater than the dielectric strength of the air in said gap.

8. Apparatus for treating non-conductive plastic film to improve the receptivity thereof to adhesives such as printing inks, comprising a non-insulated grounded metallic drum electrode, electrode means spaced radially from said drum electrode and cooperating therewith to provide an ionizing gap therebetween, means to move said plastic film over said drum and through said gap, and means including an air core resonance transformer having the secondary thereof connected across said gap for producing an alternating radio frequency electric field in said gap having an electric intensity above the disruptive electric intensity of the air in said gap.

9. Apparatus for treating non-conductive plastic film to improve the adhesion thereof to ink subsequently imprinted thereon, comprising a pair of electrode means disposed in spaced relation to provide an air gap therebetween, one of said electrode means being a non-insulated grounded metallic drum, the other of said electrode means comprising a plurality of circumferentially spaced apart metallic electrodes disposed about the periphery of said drum in radially spaced relation to said drum and cooperating therewith to form said gap, means to move said plastic film directly over the metallic surface of said drum and through said gap, and means connected across said pair of electrode means for producing an alternating, radio frequency, electric field in said gap having an electric intensity above the disruptive electric intensity of the air in said gap.

10. Apparatus for treating non-conductive plastic film to improve the receptivity thereof to adhesives such as printing inks, comprising a non-insulated grounded metallic drum electrode, electrode means spaced radially from said drum electrode and cooperating therewith to provide an ionizing gap therebetween, means to move said plastic film over said drum and through said gap, and means for producing in said gap an alternating, radio frequency, electric field having a potential gradient greater than the dielectric strength of the air in said gap, said means including a Tesla coil having the secondary thereof connected across the gap between said drum electrode and said electrode means and a spark gap oscillator for energizing the primary of said Tesla coil.

11. In the method of treating a non-conductive plastic body by subjecting a surface thereof to electric stress in a high voltage ionizing gap between spaced apart electrodes to improve the subsequent receptivity of said surface to adhesives such as inks, the steps of applying across said electrodes an alternating radio frequency generating source of sufficiently high voltage to raise the potential gradient in said gap above the disruptive electric intensity of the air in said gap, and passing said plastic body between said electrodes to expose said surface to the alternating, radio frequency, high voltage electric field and to the corona discharge and ozone in said gap incident to the breakdown of the air in said gap.

12. In the method of treating a non-conductive and unprinted plastic film to improve the subsequent receptivity thereof to adhesives such as printing inks, the improvement comprising the steps of passing said plastic film over a rotatable non-insulated grounded metallic drum, and subjecting said film to an alternating radio frequency electric field in a high voltage ionizing gap having said drum as one of the electrodes thereof, the electric field in said gap having a potential gradient greater than the disruptive electric intensity of the air in said gap.

References Cited in the file of this patent

UNITED STATES PATENTS

| | | |
|---|---|---|
| 2,319,174 | Wilson | May 11, 1943 |
| 2,588,675 | Walkup | Mar. 11, 1952 |
| 2,855,517 | Rainer | Oct. 7, 1958 |
| 2,864,756 | Rothacker | Dec. 16, 1958 |
| 2,882,412 | Cunningham | Apr. 14, 1959 |
| 2,894,139 | Magruder | July 7, 1959 |
| 2,939,956 | Parks | June 7, 1960 |